United States Patent [19]
Assaf et al.

[11] Patent Number: 5,601,688
[45] Date of Patent: Feb. 11, 1997

[54] METHOD OF AND MEANS FOR SPRAYING DROPLETS

[75] Inventors: Gad Assaf, Rehovot; Joseph Weinberg, Netanya, both of Israel

[73] Assignee: Ormat Industries Ltd., Yavne, Israel

[21] Appl. No.: 969,571

[22] Filed: Oct. 30, 1992

Related U.S. Application Data

[63] Continuation-in-part of Ser. No. 711,406, Jun. 5, 1991, abandoned, and a continuation of Ser. No. 480,045, Feb. 14, 1990, abandoned.

[51] Int. Cl.⁶ ............... B01D 1/16; B01D 3/42; C02F 1/04
[52] U.S. Cl. ............ 159/44; 159/4.01; 159/48.1; 159/48.2; 159/DIG. 40; 202/236; 203/1; 203/10; 203/90; 261/116; 261/117
[58] Field of Search .................... 159/4.01, 48.1, 159/44, 902, 48.2, 16.1, DIG. 40; 261/116, 117; 203/1, 10, 49, 90; 202/236; 210/652; 239/8

[56] References Cited

U.S. PATENT DOCUMENTS

| | | | |
|---|---|---|---|
| 3,686,828 | 8/1972 | Drake et al. | 95/221 |
| 3,998,389 | 12/1976 | Rose et al. | 261/120 |
| 4,039,144 | 8/1977 | Mee | 239/2 R |
| 4,308,039 | 12/1981 | Djololian et al. | 261/79.2 |
| 4,363,703 | 12/1982 | ElDifrawi et al. | 159/904 |
| 4,397,794 | 8/1983 | Pilo | 261/79.2 |
| 4,475,342 | 10/1984 | Assaf | 60/641.6 |
| 4,595,459 | 6/1986 | Kasakawa et al. | 159/16.1 |
| 4,704,189 | 11/1987 | Assaf | 159/48.2 |
| 4,717,049 | 1/1988 | Green et al. | 261/76 |
| 4,742,682 | 5/1988 | Assaf et al. | 60/641.1 |
| 4,863,495 | 9/1989 | Rafson | 95/206 |
| 5,261,949 | 11/1993 | Schilling | 95/227 |
| 5,269,967 | 12/1993 | Achgill | 95/233 |

Primary Examiner—Virginia Manoharan
Attorney, Agent, or Firm—Donald M. Sandler

[57] ABSTRACT

The horizontal distance traveled by droplets of starting solution sprayed into a gaseous medium above a catch basin, where the gaseous medium has a horizontal velocity component is controlled by controlling the size of the droplets as a function of the horizontal velocity component.

13 Claims, 2 Drawing Sheets

METHOD OF AND MEANS FOR SPRAYING DROPLETS

RELATED INVENTIONS

This application is a continuation in part of application Ser. No. 711,406 filed Jun. 5, 1991, abandoned, and a continuation of application Ser. No. 480,045 filed Feb. 14, 1990, abandoned, the disclosures of which are hereby incorporated by reference.

TECHNICAL BACKGROUND

The present invention relates to a method of and means for spraying droplets, and more particularly to controlling the horizontal distance traveled by droplets of starting solution sprayed into a gaseous medium above a catch basin for evaporating liquid from the starting solution under the condition that the gaseous medium has a horizontal velocity component.

BACKGROUND ART

U.S. Pat. No. 4,704,189, the disclosure of which is hereby incorporated by reference, discloses an efficient method for enhancing the evaporation of liquid from a starting solution. Essentially, droplets of starting solution are contacted by a gaseous medium under conditions that the heat content of the starting solution in contact with the gaseous medium is smaller than the heat content of the gaseous medium, the duration of contact is sufficient for most of the evaporation of solution to take place under conditions of constant enthalpy, and the vapor pressure of the gaseous medium is less than the vapor pressure at the liquid/gas interface of the end solution. While the method and apparatus of the '189 patent are particularly useful in concentrating brine, they are also applicable to concentrating industrial, and agricultural waste liquids.

One way to practice the invention in the '189 patent is to erect, in the open air, a tower, or a line of towers, carrying a plurality of spray heads to which pressurized starting solution is applied. The spray heads are elevated; and the droplets of starting solution emitted from the spray heads induce a downward flow of air that carries the droplets into a catch basin located beneath the towers. The concentrated end solution is recovered from the catch basin.

Even in the absence of wind, droplets will be carried by the downward flow of air laterally of the spray heads to locations wide of the spray heads. Under practical conditions, when the mass of droplets emitted from the spray head is subject to horizontal wind, the droplets will drift even further in the downwind direction. Thus, a larger area for the catch basin may be required than is actually available, or the droplets may be driven by the wind into undesired locations remote from the towers.

Prior to the present invention, the only control exerted on the horizontal distance traveled by the droplets before they settle into the catch basin has been to shut down the system when the wind exceeds a threshold. This is obviously not a desirable situation when a steady state supply of starting solution is being produced. Therefore, it is the object of the present invention to provide a new and improved method of and means for controlling the horizontal distance traveled by the droplets during evaporation under conditions of constant enthalpy.

BRIEF DESCRIPTION OF THE INVENTION

According to the present invention, the horizontal distance traveled by droplets of the starting solution sprayed into a gaseous medium above a catch basin under conditions where the gaseous medium has a horizontal velocity component, is controlled by controlling the size of the droplets as a function of the horizontal velocity component of the gaseous medium. Because the residence time of the droplets in the gaseous medium is inversely related to a function of the radius of the droplets, increasing the droplet size decreases the residence time of the droplets in the gaseous medium, and decreasing the droplet size increases the residence time. Consequently, by causing the droplet size to increase as the horizontal velocity component of the gaseous medium increases, the residence time of the droplets in the gaseous medium will decrease thus reducing downwind drift of the droplets.

Preferably, the starting solution is pressurized and sprayed through nozzles to produce the droplets. The size of the droplets is modulated by modulating the pressure of the starting solution.

Preferably, the starting solution is sprayed through two sets of nozzles when the horizontal velocity component exceeds the threshold, and through only one of the two sets of nozzles when the horizontal velocity component is less than the threshold. In this situation, the mass flow rate remains constant and the spraying of the droplets through the two sets of nozzles instead of through one of the two sets, will cause a reduction in pressure of the starting solution with respect to the nozzles such that the droplets size produced by the nozzles will increase.

In accordance with an aspect of the present invention, nozzles producing droplets having a heterogeneous size spectrum are used.

BRIEF DESCRIPTION OF THE DRAWINGS

Embodiments of the present invention are described by way of example with reference to the accompanying drawings whereby.

DETAILED DESCRIPTION

Figure 1:
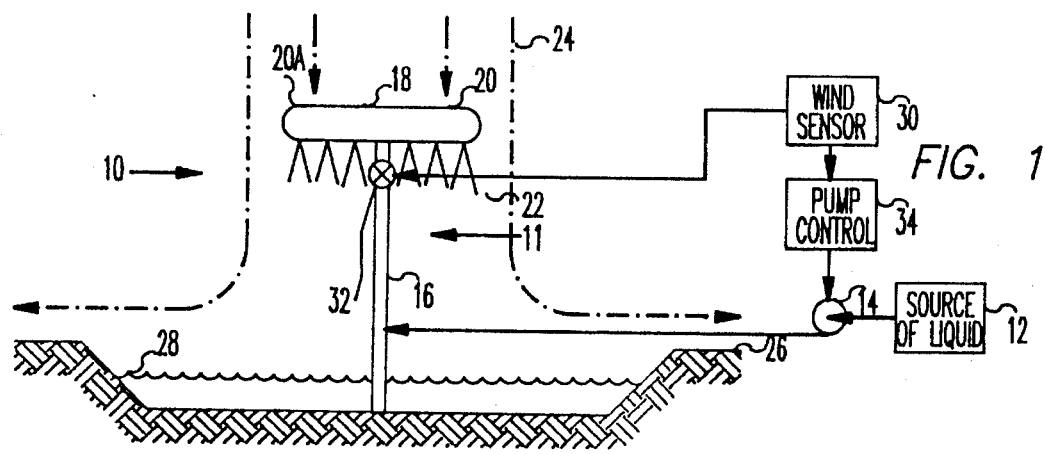
FIG. 1 is a schematic block diagram of an embodiment of the present invention.

Referring now to FIG. 1, reference numeral 10 designates an embodiment of an enhanced evaporation apparatus according to the present invention. Apparatus 10 includes spray tower 11, such as shown in FIG. 1 of the '189 patent, whereby brine in source 12 of starting solution is pressurized by pump 14 and delivered to central vertical conduit 16 of tower 11 which supplies the pressurized starting solution to a circular header 18 at the top of the conduit. Header 18 contains a number of different sets of spray nozzles 20, 20A, etc. from which starting solution issues as a spray of droplets is indicated generally by cloud 22. This mass of droplets is entrained in air column 24 which moves downwardly past header 18 and then spreads laterally in the vicinity of surface 26 of the ground. This lateral movement of droplets entrained in the air mass determines the size of catch basin 28 in the ground beneath header 18.

The operation of the apparatus shown in FIG. 1 for effecting the spraying of droplets is described in detail in the '189 patent. As explained therein, the starting solution is concentrated by an efficient, enhanced evaporation process to produce an end solution. According to the '189 patent, the contact of the starting solution with the gaseous medium must occur under the condition that the heat content of the starting medium in contact with the gaseous medium is smaller than the heat content of the gaseous medium, the duration of contact is such that most of the evaporation of solution that takes place under conditions of constant enthalpy, and the vapor pressure of the gaseous medium is less than the vapor pressure of the liquids/gas interface of said starting solution. As explained in the '189 patent, a relationship exits between the height of the header 18 and the droplet size in order to effect a concentration in the manner described above, namely evaporation under conditions of constant enthalpy.

In applying the present invention to the apparatus shown in the '189 as indicated schematically in FIG. 1, wind sensor 30 is provided to determine the horizontal component of the wind that is encountered by tower 11. In one aspect of the present invention, sensor 30 is effective to operate control valve 32 which controls the various nozzle arrays 20, 20A, etc. of the header. That is to say, the setting of valve 32 serves to direct the starting solution to one or more of the various nozzles arrays in the header. When the wind speed is below a threshold, sensor 30 sets valve 32 so that only one of the nozzle arrays, for example array 20 receives pressurized starting solution from pump 14. Under this condition, the pressure in header 18 is such that the droplets have an optimum diameter for effecting evaporation under conditions of constant enthalpy.

Figure 4:
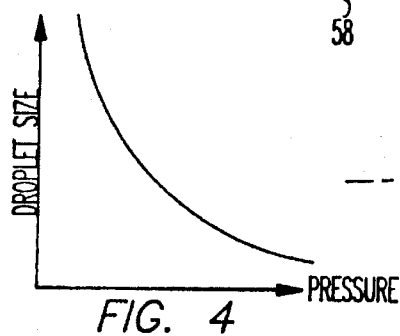
FIG. 4 is a graph that shows the relationship between the nozzle droplet size and the pressure.

The droplets will spread laterally as indicated in FIG. 1 requiring a catch basin of appropriate size. When wind sensor 30 senses a horizontal component of the wind in excess of a threshold, sensor 30 sets valve 32 so that a second group of nozzles in header 18 for example, nozzle array 20A, receives fluid from pump 14 in parallel with array 20. In this case, the fluid pressure in header 18 will be reduced by reason of an increase in the aggregate orifice area of the spray heads. Such reduction in pressure, as indicated in FIG. 4, results in an increase in droplet size which is effective to reduce the lateral spread of the droplets in the presence of wind exceeding a threshold. Thus, the larger droplets are still contained within the catch basin despite the increase in wind speed.

In a modification of this arrangement, manifold 18 may include several arrays of nozzles whose operation is effected by the setting of valve 32. Thus, a range of wind speeds can be accounted for by sensor 30 all to the end that the cloud of droplets is contained within a catch basin of preselected size.

In an alternative arrangement, sensor 30 may be used to operate pump control 34 so that the pressure of the starting solution in header 18 is varied as a function of the output of sensor 30 without changing the number of orifices which emit starting solution. Thus, for example, an increase in wind speed as sensed by sensor 30 would cause pump control 34 to modify the operation of pump 14 such that the pressure in header 18 is reduced thereby increasing the droplet size to compensate for the increasing wind speed.

A combination of controlling the outlet pressure of pump 14 and also the number of nozzle arrays which emit starting solution can be used to additionally control the spread of droplets from the tower. In general, when the horizontal component of the wind is in excess of the threshold, increasing the volume flow rate of starting solution is the preferred way to manage the spread.

Figure 2:
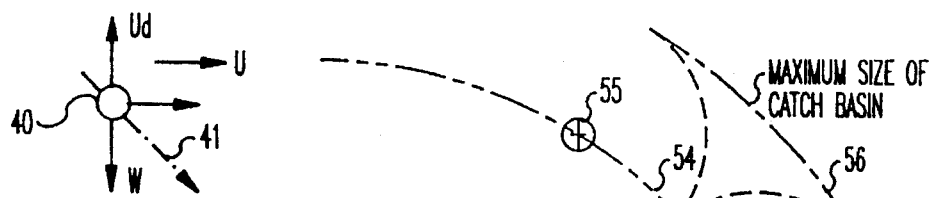
FIG. 2 is a vector diagram showing the velocity components associated with a droplet in the shower shown in FIG. 1.

Before discussing another embodiment of the present invention, reference is made to FIG. 2 which shows the various velocity components associated with droplet 40 contained within shower 22 of FIG. 1. As indicated by broken line 41, droplet 40 follows a downwardly directed trajectory dependent upon external forces other than gravity acting on the droplet. The wind acting on droplet 40 is indicated by the vector labeled U, and the downward vertical velocity of the air shower 24 is indicated by the vector labeled W. Drift velocity $U_d$ is shown as a labeled vector also directed downwardly. It can be shown that the suspension velocity of the droplet is proportional to the radius of the droplet. In addition, it can be shown that the suspension time of the droplet in the air shower can be expressed as follows:

$$T_d = (H/W_m) \ln ((W_m + U_d)/U_d) \quad (1)$$

Equation (1) is based on the assumption that the downward vertical velocity of the air shower is a maximum value $W_m$ at the top of the tower, is zero at the bottom of the shower, and varies linearly from top to bottom. The lateral distance that droplets travel is $U(T_d)$. Thus, the lateral distance L, or the radius of the catch basin, is directly related to the height of the tower, and usually inversely related to the maximum vertical airspeed of the the entraining air $W_m$.

On the other hand, L varies in inverse relation to the droplet size. When $W_m$ is small compared to $U_d$, the lateral distance is controlled substantially only by the drift velocity. Usually, when nozzles are used that produce droplets having a heterogeneous size spectrum (i.e., having droplets have a range of sizes), the extremities of the catch basin can be considered to be the distance traveled by the smallest droplets having the minimum drift velocity. Even so, the definitions of the extremities of the catch basin will include a safety margin or distance to account for the effect of turbulent fluctuations of the wind on the droplets.

When, in accordance with the present invention, evaporation of brine or starting solution takes place at constant enthalpy, the average droplet size in the preferred embodiment will be in the range 50 to 200 microns (um).

Figure 3:
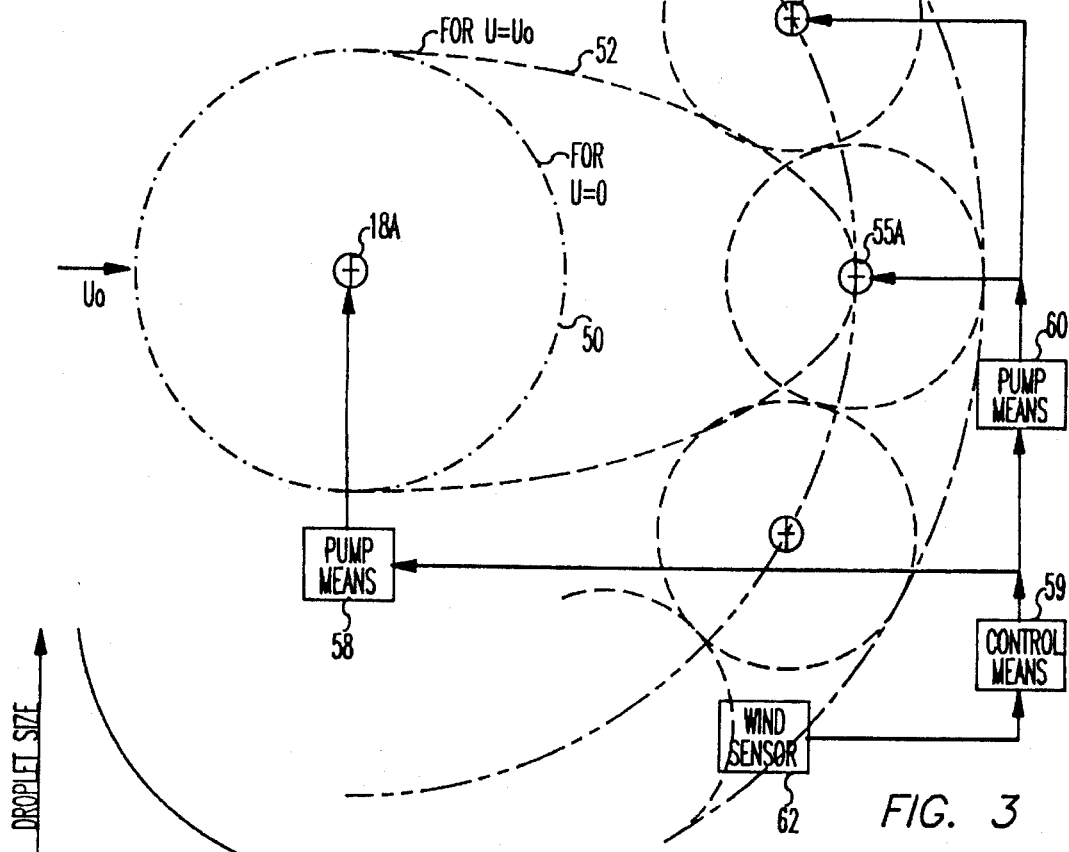
FIG. 3 is a plan view of an enhanced operation system according to the present invention showing an exterior curtain of droplets for controlling the drift of an enhanced evaporation system.

As an alternative arrangement to that shown in FIG. 1, the drift of the droplets produced by spray tower 11 can be controlled by using a shower curtain of droplets of relatively large diameter which produces a smaller drift than that associated with droplets produced by the spray tower. This is illustrated in FIG. 3 wherein tower 18A represents a tower like tower 11 shown in FIG. 1, or a tower disclosed in the '189 patent when only a single set of nozzles is used. Circle 50 represents the catch basin size required to capture the droplets produced by spray tower 18A under the condition of no wind velocity. For a wind velocity greater than zero, the drift of the droplets is indicated by curve 52 such that a circular catch basin 54 would be required in order to capture the droplets produced by spray tower 18A for a wind of velocity $U_0$ in any direction.

Arranged on circular curve 54 is a series of towers 55 like tower 18A, or a series of linear conduits of the type shown in FIG. 1A of the '189 patent. In either case, the droplets produced by the spray arrangement located on circle 54 will produce droplets much larger in diameter than the droplets produced by spray tower 18A. The large droplets produced along curve 54 will entrain smaller droplets produced by tower 18A when the wind speed exceeds the threshold $U_0$. The larger droplets, being less influenced by the wind will confine all of the droplets produced by spray tower 18A within the confines of circle 56 which represents the maximum size of the catch basin.

In order to effect the operation of the apparatus shown in FIG. 3, pump means 58, operated by control means 59, furnishes starting solution to spray tower 18A. Pump means 60, also operated by control means 59, supplies starting solution to the spray means 55A arranged along the circle 55. Finally, sensor 62 senses the wind speed to which spray tower 18A is subjected. When wind sensor 62 determines that the wind speed is less than a threshold, control means 59 responds by having pump means 58 operate in a normal manner by producing a shower of droplets that are contained within the catch basin as previously described. When the wind exceeds the threshold, control means 59 causes pump means 60 to become operational thereby creating a shower curtain which entrains the small droplets produced by tower 18A and blown by the wind away from tower 18A.

Obviously, pump means 58 and 60 can be designed to operate in an infinitely mode variable rather than stepwise so that the droplet size produced by spray tower 18A and by apparatus 55A can be varied as a function of wind speed.

While the two embodiments shown in FIGS. 1 and 3 are described as including a spray tower, it should be obvious that a linear arrangement such as that shown in FIG. 1A of the '189 patent could also be utilized. In such case, where there is a direction of prevailing wind involved, the horizontal displacement of the droplets can be controlled, in the manner described above, by increasing or decreasing the number of apertures to which the starting solution is applied, or by the provision of a spray shower of large droplets to entrain the smaller droplets produced by the spray tower or linear array, or a combination of both.

Figure 5:
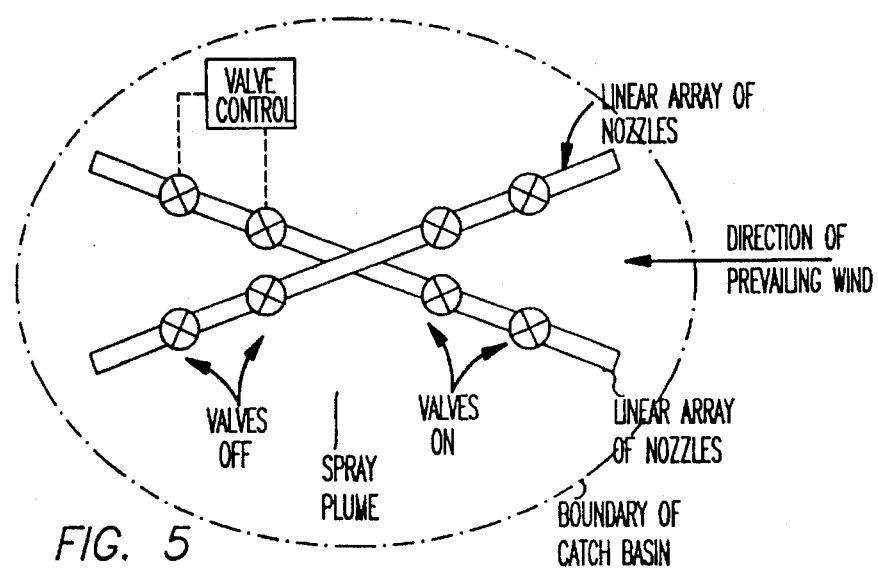
FIG. 5 is a schematic plan view of a crossed linear array of nozzles showing how modulation of the valves for controlling the flow through the nozzles ensures that drift is contained within a preselected boundary.

A further embodiment of the invention shown in FIG. 5, is particularly suitable when there is no particular direction to the prevailing wind. In such case, the nozzles are organized, for example, in two crossing linear arrays, wherein selectively operable control valves are provided for activating or deactivating certain ones of the nozzles in accordance with wind speed and direction. In this manner, the droplets produced by the activated nozzles will not drift out of the catchment area.

Figure 6:
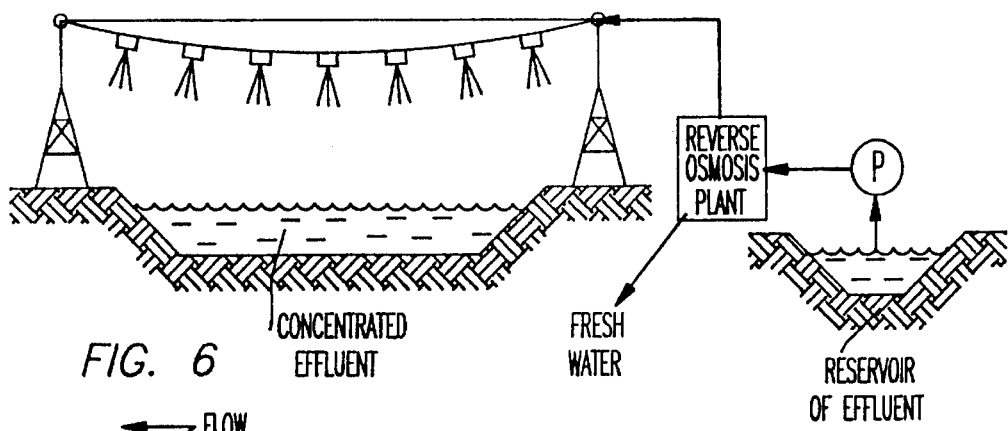
FIG. 6 is a schematic side elevation view of an enhanced evaporation system combined with a reverse osmosis plant for recovering fresh water from an effluent prior to its concentration by the system.

In a still further embodiment of the invention, an enhanced evaporation system, such as that described in the '189 patent, or those disclosed herein, can be combined with a reverse-osmosis desalination plant as shown in FIG. 6. In such case, the source of liquid may be industrial or agricultural effluent that eventually is to be disposed of. Disposal is promoted by eliminating liquid from the effluent prior to concentrate the effluent and reduce transportation costs; and to this end, an initial desalination operation recovers fresh water before a large measure of the balance of remaining water is evaporated in the enhanced evaporation systems described above.

The combination of a reverse-osmosis plant in the supply line side of the starting solution of an enhanced evaporation system is advantageous because of the pressure needed to supply starting solution to the header containing the spray nozzles. Preferably, the header will be positioned at a height of 20 to 40 meters such that the pressure in the starting solution supply conduit will be in the range 4–8 atmospheres. The use of this embodiment of the invention is particularly useful when the starting solution is industrial or agricultural effluent and brackish water (i.e., water having a solids content below about 1% by weight).

Figure 7A:
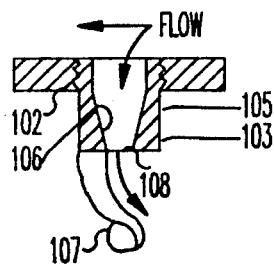
FIG. 7A is a sectional side view of a nozzle for producing a heterogeneous spectrum of droplets for the embodiment of FIG. 7.
Figure 7:
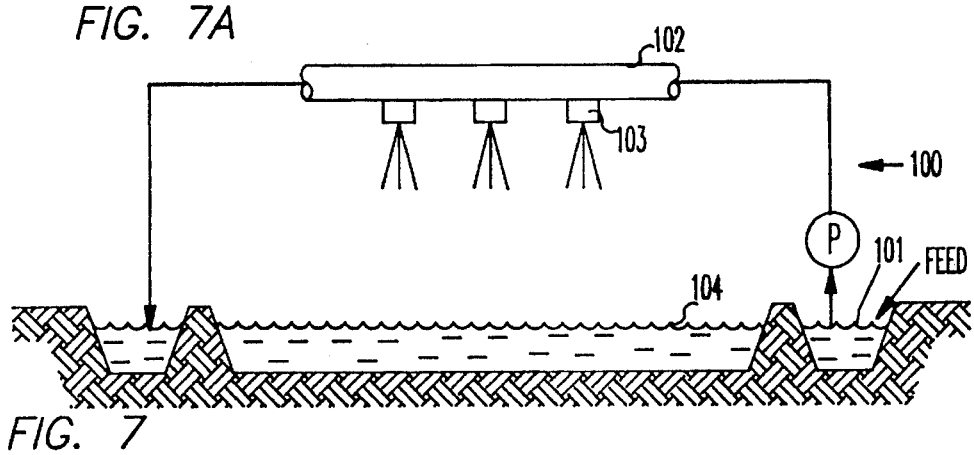
FIG. 7 is a schematic side view of an embodiment of the invention provide with an arrangement for flushing foreign material from nozzles that provide a heterogeneous spectrum of droplets.

In embodiment 100 of the invention shown in FIGS. 7 and 7A, provision is made for continuously flushing foreign material entrained in the starting solution from nozzle orifices in accordance with the teachings in the '045 copending application. Specifically, starting solution is pumped at from source 101 to header 102 positioned above the reservoir 104 where spray nozzles 103 spray the solution into the air. Less than all of the starting solution supplied to the header exits the header through the nozzles, the residual starting solution serving to flush sediment or other foreign material from the nozzles and thus prevent their clogging. The residual starting solution is returned to a collection sump and returned to source 101. The technique involved in this embodiment is applicable to all of the preceding embodiments.

FIG. 7A shows the preferred form of the nozzles which are capable of producing a heterogeneous spectra of droplets. As shown, nozzle 103 comprises a tubular body 105 containing coaxial conical bore 106 that opens on the downstream end of the body. The upstream end of the body is threaded to permit this end to be screwed into header 102 such that upstream, free end of the nozzle is substantially flush with the insider surface of the header. This permits the residual solution to flow beyond the opening in the nozzle and flush away from the nozzle any foreign material in the solution.

Nozzle 103, at it downstream free end 107 is provided with a helical spiral extension 107 on one side of the exit opening 108. Such extension, which has about one and a half turns, intercepts the solution flowing through the nozzle and produces the desired droplet spray.

The advantages and improved results furnished by the method and apparatus of the present invention are apparent from the foregoing description of the preferred embodiment of the invention. Various changes and modifications may be made without departing from the spirit and scope of the invention as described in the appended claims.

What is claimed is:

1. A method for controlling the horizontal distance traveled by droplets of starting solution sprayed into a gaseous medium from a location above a catch basin as the droplets fall vertically from said location, and where the gaseous medium has a horizontal velocity component, said method including the step of controlling the size of the droplets as a function of said horizontal velocity component including pressurizing said starting solution and spraying through two sets of nozzles when the horizontal velocity component exceeds a threshold, and through only one of said two sets of nozzles when the horizontal velocity component is less than said threshold.

2. A method for concentrating a starting solution by evaporation to produce an end solution comprising the steps of:

a) organizing a plurality of spray nozzles into a plurality of linear arrays that extend in different directions, and are positioned above the ground;

b) spraying droplets of said solution into ambient air from said spray nozzles;

c) selectively controlling the flow of starting solution through the spray nozzles in accordance with wind direction; and d) pumping effluent from a reservoir, and extracting fresh water from said effluent using a reverse osmosis plant to produce said starting solution.

3. Apparatus for concentrating a starting solution by evaporation to produce an end solution comprising:

(a) first and second spray means for spraying droplets of said starting solution into gaseous medium that absorbs vapor from said starting solution, said medium having a velocity component in a downwind direction essentially normal to the direction of spraying;

(b) a sensing means for sensing the speed of the gaseous medium in the downwind direction;

(c) means for controlling the size of the droplets sprayed into said gaseous medium by said first and second spray means in response to the sensing means for controlling the maximum horizontal distance traveled by said droplets: and d) a pump for pumping effluent from a reservoir, and a reverse osmosis plant for extracting fresh water from said effluent to produce said starting solution.

4. Apparatus for evaporating water from an aqueous solution into air having a downwind velocity component, said apparatus comprising:

(a) a catch basin;

(b) first and second sprayers located vertically above said catch basin for spraying droplets of said solution into the air for effecting evaporation of water from the droplets as the latter travel downwind and fall vertically toward the catch basin;

(c) a sensor for sending air speed in the downwind direction;

(d) a controller for controlling the size of the droplets sprayed into the air by said first and second sprayers in response to the sensor for controlling the maximum horizontal distance traveled by said droplets:

(e) wherein each of said first and second sprayers comprises a linear array of spray nozzles; and (f) wherein the linear array of said first sprayer is in a direction different from the direction of the linear array of the second sprayer.

5. Apparatus according to claim 4 wherein the two linear arrays intersect.

6. Apparatus according to claim 5 wherein the intersection of the two linear arrays forms an acute angle.

7. Apparatus according to claim 5 wherein said controller includes a valve in each array, and means for controlling the operation of the valves in accordance with the direction of prevailing wind.

8. Apparatus for concentrating a starting solution by evaporation to produce an end solution comprising:

a) a first array of nozzles for spraying droplets of said starting solution into air which absorbs vapor from the starting solution;

b) valves for controlling the operation of nozzles in said first array:

c) means for selectively controlling the operation of the valves in accordance with the direction of prevailing wind; and d) a catch basin for catching droplets and containing the end solution;

e) wherein said first array of nozzles is linear in form; and f) including a second array of nozzles for spraying droplets of said starting solution into the air.

9. Apparatus according to claim 8 wherein said second array is linear in form.

10. Apparatus according to claim 8 wherein the first and seconds arrays are linear in form and intersect each other.

11. Apparatus for concentrating a starting solution by evaporation to produce an end solution comprising:

a) a plurality of spray nozzles organized into a plurality of linear arrays that extend in different directions, and are positioned above the ground for spraying droplets of said solution into ambient air;

b) a controller for selectively controlling the flow of starting solution through the spraying nozzles in accordance with wind direction and;

c) means for selectively stopping the flow of starting solution in downwind ones of the spray nozzles for controlling the distance droplets drift downwind;

d) wherein there are at least two linear arrays.

12. Apparatus for concentrating a starting solution by evaporation to produce an end solution comprising:

a) a plurality of spray nozzles organized into a plurality of linear arrays that extend in different directions, and are positioned above the ground for spraying droplets of said solution into ambient air; and b) a controller for selectively controlling the flow of starting solution through the spray nozzles in accordance with wind direction;

c) wherein there are at least two linear arrays.

13. Apparatus according to claim 12 wherein said at least two linear arrays intersect.

* * * * *